(12) United States Patent
Ahn et al.

(10) Patent No.: US 11,335,947 B2
(45) Date of Patent: May 17, 2022

(54) POLYMER ELECTROLYTE COMPOSITION INCLUDING PERFLUORINATED IONOMER AND INORGANIC ADDITIVE AND LITHIUM SECONDARY BATTERY INCLUDING THE SAME

(71) Applicant: LG Chem, Ltd., Seoul (KR)

(72) Inventors: Kyoung Ho Ahn, Daejeon (KR); Sol Ji Park, Daejeon (KR); Jeong Woo Oh, Daejeon (KR); Jung Hoon Lee, Daejeon (KR); Chul Haeng Lee, Daejeon (KR)

(73) Assignee: LG Energy Solution, Ltd.

( * ) Notice: Subject to any disclaimer, the term of this patent is extended or adjusted under 35 U.S.C. 154(b) by 0 days.

(21) Appl. No.: 16/183,156

(22) Filed: Nov. 7, 2018

(65) Prior Publication Data

US 2019/0115616 A1 Apr. 18, 2019

Related U.S. Application Data

(63) Continuation-in-part of application No. PCT/KR2017/004553, filed on Apr. 28, 2017.

(30) Foreign Application Priority Data

| May 9, 2016 | (KR) | 10-2016-0056513 |
| May 9, 2016 | (KR) | 10-2016-0056521 |
| Apr. 25, 2017 | (KR) | 10-2017-0052972 |

(51) Int. Cl.
*H01M 10/056* (2010.01)
*H01M 10/0525* (2010.01)

(52) U.S. Cl.
CPC ..... *H01M 10/056* (2013.01); *H01M 10/0525* (2013.01); *H01M 2300/0071* (2013.01);
(Continued)

(58) Field of Classification Search
CPC ............. H01M 10/056; H01M 10/0525
(Continued)

(56) References Cited

U.S. PATENT DOCUMENTS

| 6,025,092 A | 2/2000 | Doyle et al. |
| 6,033,804 A | 3/2000 | Doyle et al. |

(Continued)

FOREIGN PATENT DOCUMENTS

| CN | 101728551 A | * | 6/2010 |
| CN | 102010555 A | * | 4/2011 |

(Continued)

OTHER PUBLICATIONS

Gervais et al., Ionomers with Highly Fluorinated Side Chains for Use in Battery and Fuel Cell Applications, 2010, ECS Transactions, 33, 683-691 (Year: 2010).*

(Continued)

*Primary Examiner* — Sean P Cullen
(74) *Attorney, Agent, or Firm* — Lerner, David, Littenberg, Krumholz & Mentlik, LLP

(57) ABSTRACT

The present invention relates to a composition for a polymer electrolyte and a lithium secondary battery using the same, and particularly, to a composition for a polymer electrolyte which includes a single ion-conductive polymer including a unit represented by Chemical Formula 1; and at least one additive selected from the group consisting of a ceramic electrolyte and inorganic particles, wherein a weight ratio of the single ion-conductive polymer:the additive(s) is 1:0.1 to 1:9, and a lithium secondary battery which exhibits an improvement in cell performance by including the same.

10 Claims, 8 Drawing Sheets

(52) U.S. Cl.
    CPC ............... *H01M 2300/0082* (2013.01); *H01M 2300/0085* (2013.01)

(58) Field of Classification Search
    USPC ........................................................ 429/307
    See application file for complete search history.

(56) References Cited

U.S. PATENT DOCUMENTS

| | | | |
|---|---|---|---|
| 8,845,933 B2 | 9/2014 | Hsu | |
| 2009/0169956 A1* | 7/2009 | Lee ..................... | H01M 8/1023 429/454 |
| 2010/0003566 A1* | 1/2010 | Tamura ................. | H01M 4/926 429/465 |
| 2012/0034528 A1* | 2/2012 | Wendman ............ | H01M 12/005 429/300 |
| 2013/0026409 A1* | 1/2013 | Baker ............... | H01M 10/0567 252/62.2 |
| 2013/0052561 A1 | 2/2013 | Hommura et al. | |
| 2013/0130036 A1* | 5/2013 | Bettiol ................ | H01M 8/1051 428/402 |
| 2015/0033307 A1 | 1/2015 | Ishikura | |
| 2015/0188109 A1* | 7/2015 | Kim .................... | H01M 50/463 429/144 |
| 2015/0255782 A1 | 9/2015 | Kim et al. | |
| 2016/0028127 A1 | 1/2016 | Ahn et al. | |

FOREIGN PATENT DOCUMENTS

| | | | | |
|---|---|---|---|---|
| JP | H03002384 B2 | | 1/1991 | |
| JP | 2002503734 A | | 2/2002 | |
| JP | 2011109045 A | * | 6/2011 | |
| JP | 2011159503 A | * | 8/2011 | |
| JP | 2011174032 A | * | 9/2011 | |
| JP | 5682153 B2 | | 3/2015 | |
| KR | 20000052944 A | | 8/2000 | |
| KR | 100541312 B1 | | 1/2006 | |
| KR | 20140033934 A | | 3/2014 | |
| KR | 20150016210 A | | 2/2015 | |
| KR | 20150050507 A | | 5/2015 | |
| KR | 20150078434 A | | 7/2015 | |
| KR | 20150103938 A | | 9/2015 | |
| KR | 20150145046 A | | 12/2015 | |
| KR | 101607024 B1 | | 3/2016 | |
| WO | WO-2011156935 A1 | * | 12/2011 | .......... H01M 8/1069 |
| WO | 2013031479 A1 | | 3/2013 | |
| WO | WO-2017196012 A1 | * | 11/2017 | ........ H01M 10/0562 |

OTHER PUBLICATIONS

Search report from International Application No. PCT/KR2017/004553, dated Aug. 2, 2017.

Bayoudh, S., et al., "Polymer Electrolytes Based on Lithium Sulfonate Derived From Perfluorovinyl Ethers; Single Ion Conductors." Polymer International, vol. 49, No. 7, 2000, pp. 703-711.

* cited by examiner

POLYMER ELECTROLYTE COMPOSITION INCLUDING PERFLUORINATED IONOMER AND INORGANIC ADDITIVE AND LITHIUM SECONDARY BATTERY INCLUDING THE SAME

CROSS-REFERENCE TO RELATED APPLICATION

This application is a national phase entry under 35 U.S.C. § 371 of International Application No. PCT/KR2017/004553, filed Apr. 28, 2017, which claims priority to and the benefit Korean Patent Application No. 10-2016-0056513, filed May 9, 2016, Korean Patent Application No. 10-2016-0056521 filed May 09, 2016, and Korean Patent Application No. 10-2017-0052972, filed Apr. 25, 2017, the disclosures of which are incorporated herein by reference in their entirety.

Technical Field

The present invention relates to a composition for a polymer electrolyte and a lithium secondary battery including the same, and particularly, to a composition for a polymer electrolyte which includes a single ion-conductive polymer having high ionic conductivity and lithium ion mobility, and a lithium secondary battery which exhibits an improvement in cell performance by including the same.

BACKGROUND ART

As energy storage technology has been widely applied to various fields such as mobile phones, camcorders, notebook PCs and electric vehicles, efforts for research on and development of batteries have materialized. In this respect, electrochemical devices have attracted the most attention.

In particular, according to a recent trend, research is being conducted on lithium secondary batteries among electrochemical devices because they have downsized and weight-lightened characteristics and exhibit high energy density and discharge voltage.

Lithium secondary batteries include a positive electrode or a negative electrode which is prepared using a material capable of intercalation and deintercalation of lithium ions as an active material, and have a liquid electrolyte or a polymer electrolyte as a medium for transferring electric charges between the positive electrode and the negative electrode.

Currently, a poly(ethylene oxide) (hereinafter, referred to as "PEO")-based polymer electrolyte has been proposed as a polymer electrolyte used in a lithium secondary battery. However, while a polymer electrolyte using PEO exhibits a relatively high ionic conductivity ($10^{-4}$ S/cm) at a high temperature of 60° C. or more, the ionic conductivity thereof may be degraded to $10^{-8}$ S/cm at room temperature. Moreover, most polymer electrolytes are known to have a low $Li^+$ mobility of about 0.2 to 0.4.

Accordingly, in order to ensure ionic conductivity at room temperature, a method of introducing various additives which are capable of controlling crystallinity of PEO as a polymer matrix has been proposed.

However, although crystallinity is controlled when additives are introduced, mechanical properties may be weakened, or a size of an additive itself affects PEO chain mobility to increase a glass transition temperature (Tg) and thus ionic conductivity at low temperature may be rather degraded.

Accordingly, for commercialization of a lithium secondary battery, there is a need for development of a polymer electrolyte having excellent interfacial stability with an electrode together with high ionic conductivity.

SUMMARY OF THE INVENTION

It is an aspect of the present invention to provide a composition for a polymer electrolyte including a single ion-conductive polymer having high ionic conductivity and lithium ion mobility.

In addition, it is another aspect of the present invention to provide a solid polymer electrolyte formed using the composition for a polymer electrolyte.

In addition, it is still another aspect of the present invention to provide an electrode composite including the composition for a polymer electrolyte.

In addition, it is yet another aspect of the present invention to provide a lithium secondary battery including the solid polymer electrolyte.

In addition, it is yet another aspect of the present invention to provide a lithium secondary battery including the electrode composite.

Specifically, according to one embodiment of the present invention, there is provided a composition for a polymer electrolyte which includes an organic solvent; a single ion-conductive polymer including a unit represented by Chemical Formula 1 below; and at least one additive selected from the group consisting of a ceramic electrolyte and inorganic particles, wherein a weight ratio of the single ion-conductive polymer:the additive(s) is 1:0.1 to 1:9.

[Chemical Formula 1]

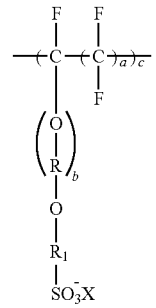

In Chemical Formula 1,

R is —$CF_2$—[$CF(CF_3)$]$_m$—[$CF_2$]$_n$— (here, m is any one integer of 0 to 3 and n is any one integer of 0 to 5), $R_1$ is —$CF_2$—($CF_2$)$_o$— (here, o is any one integer of 0 to 3), X is $H^+$ or $Li^+$, a and c represent a mole number of a repeat unit, a molar ratio of a:c is 1:1 to 10:1, and b is an integer of 0 or 1.

The single ion-conductive polymer may include at least one unit selected from the group consisting of units represented by Chemical Formulas 1a to 1d below.

[Chemical Formula 1a]

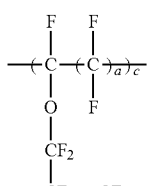

[Chemical Formula 1b]

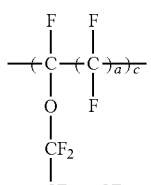

[Chemical Formula 1c]

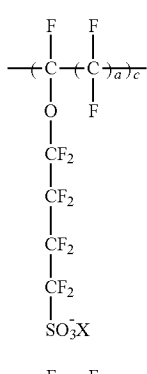

[Chemical Formula 1d]

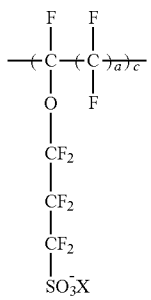

In Chemical Formulas 1a to 1d,
X is $H^+$ or $Li^+$,
a and c represent a mole number of a repeat unit, and
a molar ratio of a:c is 1:1 to 10:1.

In addition, the ceramic electrolyte that is included as an additive may include a single compound or a mixture of two or more selected from the group consisting of lithium lanthanum zirconate ($Li_7La_3Zr_2O_{12}$; LLZO), lithium aluminum germanium phosphate ($Li_{1.5}Al_{0.5}Ge_{1.5}(PO_4)_3$; LAGP), lithium aluminum titanium phosphate (LATP), lithium lanthanum titanate ($Li_{0.5}La_{0.5}TiO_3$; LLTO), lithium germanium phosphorus sulfide (LGPS), and lithium phosphorus sulfide.

In addition, the inorganic particle that is included as an additive may include a single compound or a mixture of two or more selected from the group consisting of $Al_2O_3$, $BaTiO_3$, $SnO_2$, $CeO_2$, $SiO_2$, $TiO_2$, $Li_3PO_4$, NiO, ZnO, MgO, $Mg(OH)_2$, CaO, $ZrO_2$, $Ta_2O_5$, $Y_2O_3$, $Pb(Zr,Ti)O_3$ (PZT), $Pb_{1-x}La_xZr_{1-y}Ti_yO_3$ (PLZT), $Pb(Mg_3Nb_{2/3})O_3$—$PbTiO_3$ (PMN-PT), and hafnia ($HfO_2$).

A weight ratio of the single ion-conductive polymer:the additive(s) in the composition for a polymer electrolyte may be 1:1 to 1:5.

The composition for a polymer electrolyte may further include a binder.

According to another embodiment of the present invention, there is provided a solid polymer electrolyte formed by curing the composition for a polymer electrolyte according to the present invention.

According to still another embodiment of the present invention, there is provided an electrode composite including the composition for a polymer electrolyte.

The electrode composite may include a positive electrode composite or a negative electrode composite.

Specifically, the electrode composite may include an electrode current collector and an electrode mixture layer applied on the electrode current collector, wherein the electrode mixture layer may include an electrode active material slurry and the composition for a polymer electrolyte according to the present invention.

According to yet another embodiment of the present invention, there is provided a lithium secondary battery including the solid polymer electrolyte according to the present invention.

According to yet another embodiment of the present invention, there is provided a lithium secondary battery including the electrode composite according to the present invention.

DESCRIPTION OF DRAWINGS

Because the following drawings attached to the present specification illustrate exemplary embodiments of the present invention and serve to facilitate understanding of the technical idea of the present invention together with the above-described content of the invention, the present invention should not be limitedly interpreted on the basis of the drawings.

LIST OF REFERENCE NUMERALS

Figure 1:
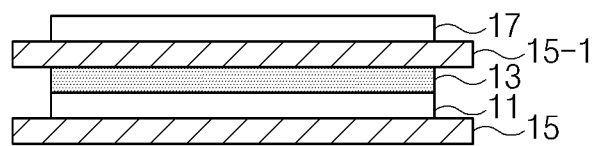
FIGS. 1 to 3 are cross-sectional views schematically illustrating various embodiments of an electrode assembly including a solid polymer electrolyte according to an example of the present invention.

11, 21, 31, 51: negative electrode
13, 23, 33: first solid polymer electrolyte 33-1: second solid polymer electrolyte
15, 25, 45, 55: first porous separator
15-1, 25-1, 45-1, 55-1: second porous separator
17, 27, 37, 47: positive electrode
49: negative electrode composite
59: positive electrode composite

MODES OF THE INVENTION

Hereinafter, the present invention will be described in detail to help in understanding of the present invention. Terms and words used in the specification and claims should not be interpreted as limited to commonly used meanings or meanings in dictionaries and should be interpreted with meanings and concepts which are consistent with the technological scope of the invention based on the principle that the inventors have appropriately defined concepts of terms in order to describe the invention in the best way.

A polymer electrolyte is under development because it is capable of significantly improving the stability of a lithium secondary battery, but still exhibits low ionic conductivity and insufficient mechanical properties compared to a liquid electrolyte/separator system.

In order to solve this problem, research has been attempted in recent years on a single ion-conductive polymer electrolyte in which anions are fixed to a main chain of a polymer and only a Li ion contributes to ionic conductivity.

The single ion-conductive polymer that refers to a polymer in which only one ion contributes to conductivity includes an anion as a stationary phase to limit the migration of an anion. Therefore, the single ion-conductive polymer electrolyte including the polymer is known to maintain relatively stable current density in the battery by preventing concentration polarization under a DC electric field, and accordingly, by preventing a decrease in ionic conductivity. Further, a single ion-conductive polymer electrolyte is known to be suitable for lithium batteries, a large-sized storage battery and the like for electric vehicles compared to when a liquid electrolyte is used because it does not have a risk of ignition.

Currently, a single ion-conductive polymer electrolyte is prepared by a method in which an acrylate polymer or a urethane-based polymer is introduced as a matrix to a solvent-free single-ion-conductive polymer whose main chain is mainly composed of an ionomer such as polyethylene oxide, polypropylene oxide, polyether, or the like, which has a dissociation ability into ions, to reinforce mechanical properties.

However, when the acrylate polymer or the urethane-based polymer is introduced as a matrix, the number of anions that can be fixed to a main chain of the polymer is limited, and thus a concentration of a charge carrier itself is decreased, and a degree of dissociation of a salt fixed to a main chain is low. For this reason, ionic conductivity is degraded compared to an existing polymer electrolyte using inorganic lithium salts. Therefore, this method has not been practically used to date.

Accordingly, by providing a composition for a polymer electrolyte which includes a single ion-conductive polymer based on an 'ionomer' composed of a repeat unit not having ionicity and a repeat unit containing a small amount of an ion and at least one additive of a ceramic electrolyte and inorganic particles, a solid polymer electrolyte, which can realize an effect of improving ionic conductivity according to uniform migration of Li$^+$ and simultaneously an effect of improving interfacial stability with an electrode and suppressing concentration polarization, and a secondary battery including the same can be manufactured.

Composition for Polymer Electrolyte

Specifically, an embodiment of the present invention provides a composition for a polymer electrolyte which includes an organic solvent; a single ion-conductive polymer including a unit represented by Chemical Formula 1 below; and at least one additive selected from the group consisting of a ceramic electrolyte and inorganic particles, wherein a weight ratio of the single ion-conductive polymer:the additive(s) is 1:0.1 to 1:9.

[Chemical Formula 1]

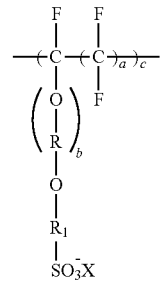

In Chemical Formula 1,
R is —CF$_2$—[CF(CF$_3$)]$_m$[CF$_2$]$_n$— (here, m is any one integer of 0 or 1 to 3 and n is any one integer of 0 or 1 to 5),
R$_1$ is —CF$_2$—(CF$_2$)$_o$— (here, o is any one integer of 0 or 1 to 2),
X is H$^+$ or Li$^+$,
a and c represent a mole number of a repeat unit,
a molar ratio of a:c is 1:1 to 10:1, and
b is an integer of 0 or 1.

(1) Organic Solvent

The composition for a polymer electrolyte according to the present invention may include an organic solvent.

The organic solvent may include an organic solvent such as N-methyl pyrrolidone (NMP), acetone, dimethylacetamide, dimethylformaldehyde (DMF), or the like, an inorganic solvent such as water or the like, or a mixture thereof as the main solvent, and the solvent may be removed in a drying process for preparing a solid polymer electrolyte to be described below.

(2) Single Ion-Conductive Polymer

In addition, the composition for a polymer electrolyte according to the present invention may include a single ion-conductive polymer including a unit represented by Chemical Formula 1.

The single ion-conductive polymer including a unit represented by Chemical Formula 1 may have an equivalent weight (hereinafter, referred to as "EW") of 300 g/eq to 880 g/eq, particularly 650 g/eq to 880 g/eq, and more particularly 650 g/eq to 800 g/eq.

In this case, the EW of the single ion-conductive polymer refers to an EW of a single ion-conductive polymer including a unit represented by Chemical Formula 1, which is required to introduce 1 mole of a sulfonate group (SO$_3^-$) into a polymer electrolyte. In other words, the EW of the single ion-conductive polymer refers to a molecular mass of a functional group for ion exchange (e.g., single ion-conductive polymer parts except a sulfonate group) per one single ion-conductive polymer including a unit represented by Chemical Formula 1 including a sulfonate group (SO$_3^-$).

When the single ion-conductive polymer has an EW of greater than 880 g/eq, an EW of a sulfonate group part is relatively decreased due to a large weight of the single ion-conductive polymer with respect to 1 mole of a sulfonate group, and thus a Li-ion transport channel is decreased. Therefore, an effect of the polymer electrolyte on ionic conduction may be degraded. Also, when the single ion-conductive polymer has an EW of less than 300 g/eq, mechanical properties of a membrane thus formed are degraded, and thus it may be difficult to maintain a membrane form during impregnation with an electrolyte.

The EW of the single ion-conductive polymer may be calculated by Formula 1 below.

EW=Concentration (mmol) of sulfonate ion/IEC   [Formula 1]

In Formula 1, the concentration of a sulfonate ion is 1,000 mmol, and IEC is an acronym for ion exchange capacity and refers to an equivalent weight of an ion that 1 g of a polymer compound can exchange. In the present invention, IEC may be calculated by multiplying a mole number of a functional group for ion exchange (i.e., single ion-conductive polymer parts except a sulfonate group in one single ion-conductive polymer including a unit represented by Chemical Formula 1) included in 1 g of a copolymer by an ion value.

More specifically, the EW of the single ion-conductive polymer may be calculated as follows. A solid polymer electrolyte formed by curing the composition for a polymer electrolyte according to the present invention is cut to a size of about 1×1 cm² to prepare a sample, and the sample is then completely dried in a vacuum in an oven at 80° C. for 24 hours (overnight). Subsequently, the dried polymer electrolyte sample is weighed, introduced into a saturated aqueous NaCl solution, and then stirred for 24 hours. Afterward, 1 to 2 drops of phenolphthalein (pH 8.3 to 10, pink) solution are introduced into the stirred solution, and a 0.1 N NaOH standard solution is slowly introduced to titrate a sulfonate ion. Then, the concentration of the titrated sulfonate ion is substituted into Formula 1.

In the composition for a polymer electrolyte according to the present invention, the single ion-conductive polymer including a unit represented by Chemical Formula 1 has an ionomer structure including a main chain composed of carbon in which hydrogen atoms are completely substituted with fluorine atoms and a side chain including a fluoroalkoxy sulfonate substituent, and thus an anion is set as a stationary phase, and only a cation source can be provided into a battery. Therefore, ionic conductivity may be improved by increasing a degree of freedom of a cation in an electrolyte. Further, since a separate electrolyte salt is not included, degradation of interfacial stability caused by concentration polarization according to conventional anion decomposition of an electrolyte salt may be suppressed.

In addition, as described below, when a liquid electrolyte is further included when necessary upon a preparation of a secondary battery, the single ion-conductive polymer may act as a cation source instead of an electrolyte salt contained in the liquid electrolyte, and therefore a content of an electrolyte salt included in the liquid electrolyte may be decreased. Therefore, a side reaction caused by an anion of an electrolyte salt is suppressed, and thus an improvement in the cycle lifespan characteristic and stability of a secondary battery at high temperature and high voltage may be realized.

The single ion-conductive polymer may include at least one unit selected from the group consisting of units represented by Chemical Formula 1a to 1d below.

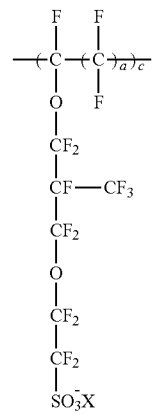

[Chemical Formula 1a]

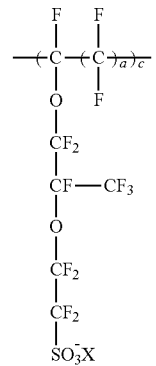

[Chemical Formula 1b]

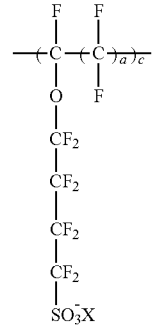

[Chemical Formula 1c]

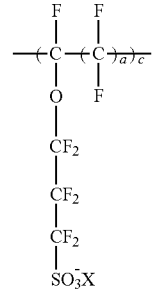

[Chemical Formula 1d]

In Chemical Formulas 1a to 1d,

X is $H^+$ or $Li^+$, a and c represent a mole number of a repeat unit, and a molar ratio of a:c is 1:1 to 10:1.

(3) Additive

In addition, the composition for a polymer electrolyte according to the present invention may further include at least one additive selected from the group consisting of a ceramic electrolyte and inorganic particles to improve bulk ionic conductivity.

As a specific example, the ceramic electrolyte may be a single compound or a mixture of two or more selected from the group consisting of lithium lanthanum zirconate ($Li_7La_3Zr_2O_{12}$; LLZO), lithium aluminum germanium phosphate ($Li_{1.5}Al_{0.5}Ge_{1.5}(PO_4)_3$; LAGP), lithium aluminum titanium phosphate (LATP), lithium lanthanum titanate ($Li_{0.5}La_{0.5}TiO_3$; LLTO), lithium germanium phosphorus sulfide (LGPS), and lithium phosphorus sulfide.

In addition, as a specific example, the inorganic particle may be a single compound or a mixture of two or more selected from the group consisting of $Al_2O_3$, $BaTiO_3$, $SnO_2$, $CeO_2$, $SiO_2$, $TiO_2$, $Li_3PO_4$, NiO, ZnO, MgO, $Mg(OH)_2$, CaO, $ZrO_2$, $Ta_2O_5$, $Y_2O_3$, $Pb(Zr,Ti)O_3$ (PZT), $Pb_{1-x}La_xZr_{1-y}TiO_3$ (PLZT), $Pb(Mg_3Nb_{2/3})O_3$—$PbTiO_3$ (PMN-PT), and hafnia ($HfO_2$).

In particular, when a ceramic electrolyte is included as the additive, it is possible to more effectively suppress concentration polarization caused by increases in $Li^+$ transference number and lithium concentration in an electrolyte upon operation of a cell.

In the composition for a polymer electrolyte, a weight ratio of the single ion-conductive polymer:the additive(s) may be 1:0.1 to 1:9, particularly 1:1 to 1:5, and more particularly 1:1 to 1:3.

When a weight ratio of the additive(s) to the single ion-conductive polymer is greater than 9, a content of the single ion-conductive polymer is relatively decreased, and therefore, it is difficult to obtain an effect of improving ionic conductivity and satisfactory interfacial resistance between an active material and an electrolyte. When a weight ratio thereof is less than 0.1, an insignificant effect of decreasing interfacial resistance is exhibited. In particular, it is preferable to include the additive(s) at a weight ratio of 1:5 or less to effectively prevent the interfacial resistance between an electrode and a polymer electrolyte from increasing.

Meanwhile, the composition for a polymer electrolyte according to an embodiment may be optionally mixed with a binder added to improve mechanical properties such as dispersibility, cohesive strength with an electrode or a separator, and the like.

As a specific example, the binder may include at least one selected from the group consisting of polyvinylidene fluoride, polytetrafluoroethylene, polyvinyl chloride, polyvinyl pyrrolidone, polyvinyl alcohol, Teflon, and styrene-butadiene rubber, and particularly, may include polyvinylidene fluoride.

The binder may be included in a small amount of 10 wt % or less, particularly, 5 wt % or less based on a total content of the composition for a polymer electrolyte. More specifically, the binder may be included in an amount of 10 parts by weight to 40 parts by weight, particularly, 15 parts by weight to 30 parts by weight with respect to 100 parts by weight of the single ion-conductive polymer.

When the binder is included in an amount of less than 10 parts by weight, an insignificant effect of improving mechanical properties such as cohesive strength and the like may be exhibited. Also, when the binder is included in an amount of greater than 40 parts by weight, cohesive strength may be increased, but interfacial resistance between an electrode and an electrolyte may be increased due to an excessive amount of the binder.

Solid Polymer Electrolyte

In addition, another embodiment of the present invention provides a solid polymer electrolyte formed of the composition for a polymer electrolyte.

The solid polymer electrolyte according to the present invention may be prepared in a solid form such as a film form by evaporating an organic solvent included in the composition for a polymer electrolyte and curing the composition, and then introduced as a membrane in a freestanding form to one surface of an electrode or an interface between an electrode and a separator.

The solid polymer electrolyte may be prepared in a membrane, film or sheet form having a thickness of 200 μm or less, for example, 0.1 to 100 μm, for example, 1 to 40 μm. In this case, in order to prepare a solid polymer electrolyte in a sheet, film or membrane form, the composition for a polymer electrolyte may be applied to a substrate using a known method such as spin coating, roll coating, curtain coating, extrusion, casting, screen printing, inkjet printing, or the like, and then dried.

Specifically, the solid polymer electrolyte may be disposed at ☐ an interface between a positive electrode and a separator or ☐ an interface between a negative electrode and a separator in an electrode assembly structure (see FIGS. 1 and 2 to be described below), or may be applied to ☐ a negative electrode and a positive electrode so as to act as a freestanding separator in a form of a membrane film instead of a separator (see FIG. 3 to be described below). In this case, a separator may not be included as an essential component in a lithium secondary battery.

Electrode Composite

In addition, still another embodiment of the present invention provides an electrode composite including the composition for a polymer electrolyte.

In this case, the electrode composite may be a positive electrode composite or a negative electrode composite.

The electrode composite may include an electrode current collector and an electrode mixture layer applied on the electrode current collector, wherein the electrode mixture layer may include an electrode active material slurry and the composition for a polymer electrolyte according to the present invention.

That is, the electrode composite may be prepared by mixing an electrode active material slurry and the composition for a polymer electrolyte according to the present invention, and then applying the mixture on an electrode current collector, followed by drying.

In this case, the composition for a polymer electrolyte may be included in an amount of 0.1 to 40 parts by weight, particularly, 3.0 to 30 parts by weight with respect to 100 parts by weight of the electrode active material slurry.

When a content of the composition for a polymer electrolyte is greater than 40 parts by weight, a content of an electrode active material is relatively decreased, and thus capacity may be degraded. On the other hand, when a content thereof is less than 0.1 part by weight, an insignificant effect of decreasing interfacial resistance with an electrode and suppressing concentration polarization may be exhibited.

As such, when an electrode composite is prepared by mixing an electrode active material slurry with a composition for a polymer electrolyte, the composition for a polymer electrolyte is uniformly disposed in an electrode layer, and thus an effect of conductivity (resistance) of an electrode becoming uniform may be exhibited. That is, when a liquid electrolyte is used, resistance may be temporarily increased due to a lack of cations at an interface of an electrolyte caused by the migration of Li$^+$ upon charging and discharging. Such a phenomenon may be further intensified when a thickness of an electrode is increased. On the other hand, when a solid polymer electrolyte is used, concentration polarization may be suppressed even when a thickness of an electrode (loading amount) is increased, and thus it is possible to prevent interfacial resistance with an electrode from increasing. In particular, compared to when a solid polymer electrolyte is introduced as described above, when a composite is formed by introducing a polymer electrolyte component to an electrode, concentration polarization is more effectively suppressed, and thus stability of a secondary battery may be further reinforced.

Meanwhile, the electrode composite according to the present invention may also include a coating layer composed of the composition for a polymer electrolyte according to the present invention and applied on the electrode mixture layer.

That is, the electrode composite may be prepared by forming an electrode mixture layer including an electrode active material slurry on an electrode current collector, and forming a coating layer including the composition for a polymer electrolyte according to the present invention on the electrode mixture layer, followed by drying.

In this case, coating may be performed by a common coating method, particularly, a known method such as spin coating, roll coating, curtain coating, extrusion, casting, screen printing, inkjet printing, or the like.

Lithium Secondary Battery

In addition, yet another embodiment of the present invention provides a lithium secondary battery including the solid polymer electrolyte according to the present invention.

Figure 2:
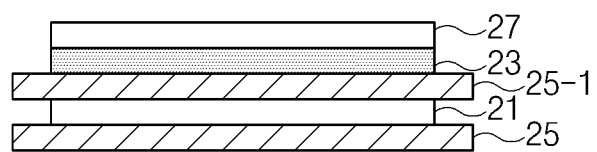
Figure 3:
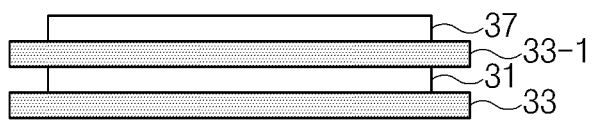

The lithium secondary battery according to the present invention may include an electrode assembly of various structures including the solid polymer electrolyte formed of the composition for a polymer electrolyte as schematically shown in FIG. 1 to FIG. 3. In this case, the electrode assembly according to the present invention is not limited thereto.

First, referring to FIG. 1, the lithium secondary battery according to the present invention may include an electrode assembly in which a first solid polymer electrolyte 13 is interposed at an interface between a second porous separator 15-1 and a negative electrode 11.

For this, the electrode assembly may be prepared by sequentially laminating a first porous separator 15, the negative electrode 11, the first solid polymer electrolyte 13, the second porous separator 15-1, and a positive electrode 17.

Alternatively, referring to FIG. 2, the lithium secondary battery according to the present invention may include an electrode assembly in which a first solid polymer electrolyte 23 is interposed at an interface between a second porous separator 25-1 and a positive electrode 27.

For this, the electrode assembly may be prepared by sequentially laminating a first porous separator 25, a negative electrode 21, the second porous separator 25-1, the first solid polymer electrolyte 23, and the positive electrode 27.

Alternatively, referring to FIG. 3, the lithium secondary battery according to the present invention may include an electrode assembly in which a second solid polymer electrolyte 33-1 is interposed at an interface between a positive electrode 37 and a negative electrode 31 instead of a separator.

For this, the electrode assembly may be prepared by laminating a first solid polymer electrolyte 33, the negative electrode 31, the second solid polymer electrolyte 33-1, and the positive electrode 37.

In this case, the first solid polymer electrolytes 13, 23, 33 and the second solid polymer electrolyte 33-1 may be prepared in a film form by applying the composition for a polymer electrolyte according to the present invention on a substrate, followed by drying. Subsequently, the first and second solid polymer electrolytes may be introduced as a membrane in a freestanding form by removing the substrate.

The solid polymer electrolyte may have a thickness of 5 to 200 μm. The solid polymer electrolyte may have an interfacial resistance of about 0 to 200 kΩ at 25° C., which may be measured using VMP3 commercially available from Bio-Logic Science Instruments.

Meanwhile, the positive electrode and the negative electrode which constitute the electrode assembly in the lithium secondary battery according to the present invention may be manufactured by a common method known in the art. For example, the electrodes may be manufactured by mixing an electrode active material with a solvent, if necessary, a binder, a conductive material, or a dispersant, stirring the mixture to prepare a slurry, and then applying the slurry on a current collector made of a metal material, followed by compression and drying.

Specifically, the positive electrode may be manufactured by applying, on a positive electrode current collector, a positive electrode active material slurry prepared by optionally mixing a positive electrode active material with a conductive material, a binder, a solvent, or the like, followed by drying and rolling.

The positive electrode current collector is generally manufactured with a thickness of 3 to 500 μm. Such a positive electrode current collector is not particularly limited as long as it does not cause a chemical change in the battery and has high conductivity. For example, the positive electrode current collector may be stainless steel, aluminum, nickel, titanium, calcined carbon, or aluminum or stainless steel whose surface is treated with carbon, nickel, titanium, silver, or the like.

The positive electrode current collector may have fine irregularities at a surface thereof to increase adhesion of the positive electrode active material. In addition, the positive electrode current collector may be used in any of various forms such as a film, a sheet, a foil, a net, a porous material, a foam, a non-woven fabric, and the like.

The positive electrode active material may be a compound capable of reversible intercalation and deintercalation of lithium, and particularly, may include a lithium composite metal oxide including lithium and one or more metals such as cobalt, manganese, nickel or aluminum. More particularly, the lithium composite metal oxide may be any one or a mixture of two or more of lithium-manganese-based oxides (e.g., $LiMnO_2$, $LiMn_2O_4$ or the like), lithium-cobalt-based oxides (e.g., $LiCoO_2$ or the like), lithium-nickel-based oxides (e.g., $LiNiO_2$ or the like), lithium-nickel-manganese-based oxides (e.g., $LiNi_{1-Y}Mn_YO_2$ (here, $0<Y<1$), $LiMn_{2-Z}Ni_ZO_4$ (here, $0<Z<2$) or the like), lithium-nickel-cobalt-based oxides (e.g., $LiNi_{1-Y1}Co_{Y1}O_2$ (here, $0<Y1<1$) or the like), lithium-manganese-cobalt-based oxides (e.g., $LiCo_{1-Y2}Mn_{Y2}O_2$ (here, $0<Y2<1$), $LiMn_{2-Z1}Co_{Z1}O_4$ (here, $0<Z1<2$) or the like), lithium-nickel-manganese-cobalt-based oxides (e.g., $Li(Ni_pCo_qMn_{r1})O_2$ (here, $0<p<1$, $0<q<1$, $0<r1<1$, and $p+q+r1=1$), $Li(Ni_{p1}Co_{q1}Mn_{r2})O_4$ (here, $0<p1<2$, $0<q1<2$, $0<r2<2$, and $p1+q1+r2=2$) or the like), or lithium-nickel-cobalt-transition metal (M) oxides (e.g., $Li(Ni_{p2}Co_{q2}Mn_{r3}M_{S2})O_2$ (here, M is selected from the group consisting of Al, Fe, V, Cr, Ti, Ta, Mg and Mo, and p2, q2, r3 and s2 represent an atomic fraction of each independent element, and satisfy $0<p2<1$, $0<q2<1$, $0<r3<1$, $0<s2<1$, and p2+q2+r3+s2=1) or the like). Among these, in terms of improving the capacity characteristic and increasing the stability of a battery, the lithium composite metal oxide may be $LiCoO_2$, $LiMnO_2$, $LiNiO_2$, a lithium-nickel-manganese-cobalt-based oxide (e.g., $Li(Ni_{0.6}Mn_{0.2}Co_{0.2})O_2$, $Li(Ni_{0.5}Mn_{0.3}Co_{0.2})O_2$, $Li(Ni_{0.8}Mn_{0.1}Co_{0.1})O_2$ or the like), or a lithium-nickel-cobalt-aluminum-based oxide (e.g., $Li(Ni_{0.8}Co_{0.15}Al_{0.05})O_2$ or the like). In consideration of a significant improvement effect according to adjustment of the type and content ratio of components of which the lithium composite metal oxide is formed, the lithium composite metal oxide may be any one or a mixture of two or more of $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, $Li(Ni_{0.8}Mn_{0.1}Co_{0.1})O_2$ and the like.

The positive electrode active material may be included in an amount of 80 to 99 wt % based on a total weight of solid content in the positive electrode active material slurry.

The conductive material is commonly added in an amount of 1 to 30 wt % based on a total weight of solid content in the positive electrode active material slurry.

Such a conductive material is not particularly limited as long as it does not cause a chemical change in the battery and has conductivity. For example, the conductive material may be graphite; a carbon-based material such as carbon black, acetylene black, Ketjen black, channel black, furnace black, lamp black, thermal black or the like; a conductive fiber such as carbon fiber, metallic fiber or the like; metallic powder such as carbon fluoride powder, aluminum powder, nickel powder or the like; a conductive whisker such as zinc oxide, potassium titanate or the like; a conductive metal oxide such as titanium oxide or the like; or a conductive material such as a polyphenylene derivative or the like. Specific examples of a commercially available conductive material may include the acetylene black series (commercially available from Chevron Chemical Company, Denka Singapore Private Limited or Gulf Oil Company), Ketjen black, the EC series (commercially available from Armak Company), Vulcan XC-72 (commercially available from Cabot Company) and Super P (commercially available from Timcal).

The binder is a component that assists bonding between an active material and a conductive material and bonding to a current collector, and is commonly added in an amount of 1 to 30 wt % based on a total weight of solid content in the positive electrode active material slurry. Such a binder may be, for example, polyvinylidene fluoride (PVDF), polyvinyl alcohol, carboxymethyl cellulose (CMC), starches, hydroxypropyl cellulose, regenerated cellulose, polyvinyl pyrrolidone, tetrafluoroethylene, polyethylene, polypropylene, an ethylene-propylene-diene terpolymer (EPDM), sulfonated EPDM, styrene-butadiene rubber, fluororubber, various copolymers, or the like.

The solvent may be an organic solvent such as NMP or the like, and may be used in an amount in which preferable viscosity is exhibited when the positive electrode active material, optionally, a binder, a conductive material, and the like are included. For example, the solvent may be included in such a way that a solid concentration in the positive electrode active material slurry is 50 to 95 wt %, preferably, 70 to 90 wt %.

In addition, the negative electrode may be manufactured by applying, on a negative electrode current collector, a negative electrode active material slurry prepared by optionally mixing a negative electrode active material with a conductive material, a binder, a solvent, or the like, followed by drying and rolling.

The negative electrode current collector is generally manufactured with a thickness of 3 to 500 μm. Such a negative electrode current collector is not particularly limited as long as it does not cause a chemical change in the battery and has conductivity. For example, the negative electrode current collector may be copper, stainless steel, aluminum, nickel, titanium, calcined carbon, copper or stainless steel whose surface is treated with carbon, nickel, titanium, silver, or the like, an aluminum-cadmium alloy, or the like. Also, like the positive electrode current collector, the negative electrode current collector may have fine irregularities at a surface thereof to increase adhesion of the negative electrode active material. In addition, the negative electrode current collector may be used in any of various forms such as a film, a sheet, a foil, a net, a porous material, a foam, a non-woven fabric, and the like.

The negative electrode active material may be used together with lithium metal, a lithium alloy or a lithium metal oxide such as lithium titanium oxide (LTO); carbon such as hard carbon, graphite-based carbon or the like; a metal composite oxide such as $Li_{x1}Fe_2O_3$ ($0 \le x1 \le 1$), $Li_{x2}WO_2$ ($0 \le x2 \le 1$), $Sn_{x3}Me_{1-x3}Me'_yO_z$ (Me: Mn, Fe, Pb, Ge; Me': Al, B, P, Si, group 1, group 2 and group 3 elements in the periodic table, halogen elements; $0 < x3 \le 1$; $1 \le y \le 3$; and $1 \le z \le 8$) or the like; a silicon-based alloy; a tin-based alloy; a metal oxide such as $SnO$, $SnO_2$, $PbO$, $PbO_2$, $Pb_2O_3$, $Pb_3O_4$, $Sb_2O_3$, $Sb_2O_4$, $Sb_2O_5$, $GeO$, $GeO_2$, $Bi_2O_3$, $Bi_2O_4$, $Bi_2O_5$ or the like; or a conductive polymer such as polyacetylene or the like. The lithium alloy may be an alloy of lithium and at least one metal selected from Na, K, Rb, Cs, Fr, Be, Mg, Ca, Sr, Ba, Ra, Al and Sn.

The negative electrode active material may be included in an amount of 60 to 97 wt %, preferably, 80 to 97 wt % based on a total weight of solid content in the negative electrode active material slurry.

In addition, the conductive material is not particularly limited as long as it does not cause a side reaction with other components of a secondary battery and has conductivity. For example, the conductive material may be a single material or a mixture of two or more selected from the group consisting of natural graphite, artificial graphite, carbon black, acetylene black, Ketjen black, channel black, furnace black, lamp black, thermal black, carbon nanotubes, fullerenes, carbon fiber, metallic fiber, carbon fluoride powder, aluminum powder, nickel powder, zinc oxide, potassium titanate, titanium oxide, and a polyphenylene derivative.

The conductive material may be added in an amount of about 0.05 to 3 wt % based on a total weight of solid content of the negative electrode active material slurry.

The binder serves to maintain a molded body by binding active material particles, and may be a single compound or a mixture of two or more selected from the group consisting of acrylonitrile-butadiene rubber, styrene-butadiene rubber (SBR), hydroxylethyl cellulose, a vinylidenefluoride-hexafluoropropylene copolymer (PVDF-co-HFP), polyvinylidene fluoride, polyvinyl alcohol, starches, polyacrylonitrile, hydroxypropyl cellulose, regenerated cellulose, polymethyl methacrylate, polyvinyl pyrrolidone, tetrafluoroethylene, polyethylene, polypropylene, polyacrylic acid, an ethylene-propylene-diene monomer (EPDM), sulfonated EPDM, and polytetrafluoroethylene (PTFE).

The binder may be included in an amount of about 0.5 to 3 wt % based on a total weight of solid content in the negative electrode active material slurry. In this case, when the binder is included in an amount of less than 0.5 wt %, it is difficult to ensure adhesion with an electrode, and when the binder is included in an amount of greater than 3 wt %, electrode resistance may be increased.

The solvent may be water or an organic solvent such as NMP, an alcohol, or the like. In consideration of a thickness of an applied electrode active material slurry and manufacturing yield, the solvent may be used in an amount at which the degree of viscosity enables the electrode active material, the binder, the conductive material, and the like to be dissolved and dispersed. For example, the solvent may be included in such a way that a solid concentration in the entire electrode active material slurry including a negative electrode active material, a binder, a conductive material, and a cellulose-based compound is 50 to 95 wt %, preferably, 70 to 90 wt %.

In addition, the separator, which is optionally introduced into the lithium secondary battery, serves to block the internal short circuit of both electrodes, and is impregnated with an electrolyte. The separator may be a polyolefin-based polymer such as chemical resistant and hydrophobic polypropylene or the like; a composite porous separator in which an inorganic material is added to a porous separator substrate; or a sheet or a non-woven fabric made of glass fiber or polyethylene. Specifically, the separator may be a common porous polymer film, that is, polyethylene, polypropylene, polyvinylidene fluoride or a multi-layer membrane of two or more thereof, and may also be a mixed multi-layer membrane such as a two-layer separator of polyethylene/polypropylene, a three-layer separator of polyethylene/polypropylene/polyethylene, or a three-layer separator of polypropylene/polyethylene/polypropylene. Alternatively, the separator may be a common porous non-woven fabric, for example, a non-woven fabric made of glass fiber with a high melting point, polyethylene terephthalate fiber or the like, but the present invention is not limited thereto.

The porous separator may generally have a pore diameter of 0.01 to 50 µm and a porosity of 5 to 95%. Also, the porous separator may generally have a thickness of 5 to 300 µm.

Figure 4:
FIGS. 4 and 5 are cross-sectional views schematically illustrating various embodiments of an electrode composite including a composition for a polymer electrolyte according to an example of the present invention.
Figure 5:
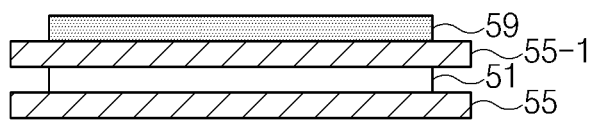

In addition, the lithium secondary battery according to the present invention may include an electrode composite including the composition for a polymer electrolyte according to the present invention as schematically shown in FIG. 4 and FIG. 5. In this case, the lithium secondary battery according to the present invention is not limited thereto.

The electrode composite may be a positive electrode composite or a negative electrode composite.

In this case, the lithium secondary battery may optionally further include a separator.

Specifically, referring to FIG. 4, the lithium secondary battery according to the present invention may include an electrode assembly in which a negative electrode composite 49 is interposed at an interface between a first porous separator 45 and a second porous separator 45-1.

That is, the electrode assembly may be prepared by sequentially laminating the first porous separator 45, the negative electrode composite 49, the second porous separator 45-1, and a positive electrode 47.

The negative electrode composite 49 may be prepared by applying, on a negative electrode current collector (not shown), a negative electrode mixture layer (not shown) including a negative electrode active material slurry and the composition for a polymer electrolyte according to the present invention.

In addition, referring to FIG. 5, the lithium secondary battery according to the present invention may include an electrode assembly in which a positive electrode composite 59 is disposed on a second porous separator 55-1.

That is, the electrode assembly may be prepared by sequentially laminating a first porous separator 55, a negative electrode 51, the second porous separator 55-1, and the positive electrode composite 59.

The positive electrode composite 59 may be prepared by applying, on a positive electrode current collector (not shown), a positive electrode mixture layer (not shown) including a positive electrode active material slurry and the composition for a polymer electrolyte according to the present invention.

The positive electrode composite and the negative electrode composite may be prepared by a common method known in the art. For example, the positive electrode composite and the negative electrode composite may be prepared by mixing an electrode active material slurry and the composition for a polymer electrolyte according to the present invention, if necessary, mixing a binder, a conductive material, or a dispersant, stirring a mixture to prepare a slurry, and then applying the slurry on a current collector (not shown) made of a metal material, followed by compression and drying.

In this case, the composition for a polymer electrolyte may be included in an amount of 0.1 to 40 parts by weight, particularly, 3.0 to 30 parts by weight with respect to 100 parts by weight of the electrode active material slurry.

When a content of the composition for a polymer electrolyte is greater than 40 parts by weight, a content of an active material is relatively decreased, and thus capacity may be degraded. On the other hand, when a content thereof is less than 0.1 part by weight, an insignificant effect of decreasing interfacial resistance with an electrode and suppressing concentration polarization may be exhibited.

In addition, in another embodiment of the present invention, the lithium secondary battery according to the present invention may include an electrode composite prepared by applying an electrode active material slurry on an electrode current collector (not shown) to form an electrode mixture layer (not shown), and then applying the composition for a polymer electrolyte according to the present invention on the electrode mixture layer (not shown), followed by drying.

In addition, the lithium secondary battery according to the present invention may be manufactured by loading an electrode assembly including a solid polymer electrolyte and/or an electrode composite in a case, and then optionally further injecting a liquid electrolyte before sealing the case to lower a cell operating temperature.

The liquid electrolyte includes an electrolyte salt and a non-aqueous organic solvent.

The electrolyte salt may be any one commonly used in an electrolyte for a lithium secondary battery without limitation. For example, the electrolyte salt may include $Li^+$ as a cation and at least one selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $BF_2C_2O_4^-$, $BC_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(F_2SO_2)_2N^-$, $CF_3CF_2(CF_3)_2CO^-$, $(CF_3SO_2)_2CH^-$, $CF_3(CF_2)_7SO_3^-$, $CF_3CO_2^-$, $CH_3CO_2^-$, $SCN^-$ and $(CF_3CF_2SO_2)_2N^-$ as an anion. The electrolyte salt may be used alone or in combination of two or more if necessary.

The electrolyte salt may be used alone or in combination of two or more if necessary. Although the electrolyte salt may be appropriately adjusted within a commonly usable range, it may be included at a concentration of 0.8 to 2 M in an electrolyte to obtain an optimum effect of forming a film for preventing corrosion of an electrode surface.

In addition, the non-aqueous organic solvent may be any organic solvent that can be commonly used without particular limitation. As a specific example, the non-aqueous organic solvent may be a cyclic carbonate, a linear carbonate, a lactone, an ether, an ester, a sulfoxide, acetonitrile, a lactam, a ketone, or the like.

The cyclic carbonate may be, for example, ethylene carbonate (EC), propylene carbonate (PC), butylene carbonate (BC), fluoroethylene carbonate (FEC), or the like, and the linear carbonate may be, for example, diethyl carbonate (DEC), dimethyl carbonate (DMC), dipropyl carbonate (DPC), ethyl methyl carbonate (EMC), methyl propyl carbonate (MPC), or the like.

The lactone may be, for example, gamma-butyrolactone (GBL), and the ether may be, for example, dibutyl ether, tetrahydrofuran, 2-methyl tetrahydrofuran, 1,4-dioxane, 1,2-dimethoxyethane, 1,2-diethoxyethane, or the like. The ester may be, for example, ethyl formate, propyl formate, methyl acetate, ethyl acetate, propyl acetate, methyl propionate, ethyl propionate, butyl propionate, or the like. Also, the sulfoxide may be dimethyl sulfoxide or the like, the lactam may be N-methyl-2-pyrrolidone (NMP) or the like, and the ketone may be poly(methyl vinyl ketone). Also, a halogen derivative of the organic solvent may also be used. These organic solvents may be used alone or in combination thereof.

In this case, when a surface of the solid polymer electrolyte according to the present invention is impregnated with a liquid electrolyte, a single ion-conductive polymer is impregnated with a liquid to form a gel polymer electrolyte, and the additive is present as a solid electrolyte in the gel polymer electrolyte. Here, the polymer electrolyte may have an ionic conductivity ($\sigma$) of greater than $2.0 \times 10^{-4}$ S/cm at room temperature, that is, at 25° C., and particularly, a lithium ionic conductivity of $3.0 \times 10^{-4}$ to $2.0 \times 10^{-2}$ S/cm.

The ionic conductivity may be measured using an impedance analysis system, and particularly, may be measured under conditions of an AC method (1 MHz to 100 mHz) and an amplitude of 10 mV using VMP3 commercially available from Bio-Logic Science Instruments.

The appearance of the lithium secondary battery according to the present invention thus manufactured is not particularly limited, but it may be a cylindrical form using a can, a rectangular form, a pouch form, a coin form or the like.

Hereinafter, exemplary embodiments of the present invention will be described in detail to specifically describe the present invention. However, the embodiments according to the present invention are provided merely to fully convey the concept of the present invention to those skilled in the art, and may be embodied in many different forms and should not be construed as being limited to the embodiments to be described below.

EXAMPLES

Example 1

An ionomer represented by Chemical Formula 1a (a molar ratio of a:c was 1:1, and an EW was 720) and LLZO (an average particle diameter (D50) of 300 nm) were added at a weight ratio of 1:1.5 to N-methylpyrrolidone (NMP) as an organic solvent and mixed to prepare a composition for a polymer electrolyte. Afterward, the composition was applied on a substrate and dried, thereby preparing a solid polymer electrolyte having a thickness of 50 μm.

Example 2

An ionomer represented by Chemical Formula 1b (a molar ratio of a:c was 1:1, and an EW was 710) and LLZO (an average particle diameter (D50) of 300 nm) were added at a weight ratio of 1:1.5 to NMP and mixed to prepare a composition for a polymer electrolyte. Afterward, the composition was applied on a substrate and dried, thereby preparing a solid polymer electrolyte having a thickness of 50 μm.

Example 3

An ionomer represented by Chemical Formula 1c (a molar ratio of a:c was 1:1, and an EW was 690) and LLZO (an average particle diameter (D50) of 300 nm) were added at a weight ratio of 1:1.5 to NMP and mixed to prepare a composition for a polymer electrolyte. Afterward, the composition was applied on a substrate and dried, thereby preparing a solid polymer electrolyte having a thickness of 50 μm.

Example 4

An ionomer represented by Chemical Formula 1d (a molar ratio of a:c was 1:1, and an EW was 660) and LLZO (an average particle diameter (D50) of 300 nm) were added at a weight ratio of 1:1.5 to NMP and mixed to prepare a composition for a polymer electrolyte. Afterward, the composition was applied on a substrate and dried, thereby preparing a solid polymer electrolyte having a thickness of 50 μm.

Example 5

An ionomer represented by Chemical Formula 1d (a molar ratio of a:c was 1:1, and an EW was 660), LLZO (an average particle diameter (D50) of 300 nm), and PVDF as a binder were added at a weight ratio of 1:9:0.25 to NMP and mixed to prepare a composition for a polymer electrolyte. Afterward, the composition was applied on a substrate and dried, thereby preparing a solid polymer electrolyte having a thickness of 50 μm.

Example 6

An ionomer represented by Chemical Formula 1d (a molar ratio of a:c was 1:1, and an EW was 660), LLZO (an average particle diameter (D50) of 300 nm), and PVDF as a binder were added at a weight ratio of 1:5:0.25 to NMP and mixed to prepare a composition for a polymer electrolyte. Afterward, the composition was applied on a substrate and dried, thereby preparing a solid polymer electrolyte having a thickness of 50 μm.

Example 7

An ionomer represented by Chemical Formula 1d (a molar ratio of a:c was 1:1, and an EW was 660), LLZO (an average particle diameter (D50) of 300 nm), and PVDF as a binder were added at a weight ratio of 1:3:0.25 to NMP and mixed to prepare a coating solution. Afterward, the coating solution was applied on a substrate and dried, thereby preparing a solid polymer electrolyte having a thickness of 50 μm.

Example 8

An ionomer represented by Chemical Formula 1d (a molar ratio of a:c was 1:1, and an EW was 660), LLZO (an average particle diameter (D50) of 300 nm), and PVDF as a binder were added at a weight ratio of 1:0.1:0.25 to NMP and mixed to prepare a coating solution. Afterward, the coating solution was applied on a substrate and dried, thereby preparing a solid polymer electrolyte having a thickness of 50 μm.

Comparative Example 1

A solid polymer electrolyte having a thickness of 50 μm was prepared in the same manner as in Example 5 except that a ceramic electrolyte (LLZO) was not added.

Comparative Example 2

An ionomer represented by Chemical Formula 1d (a molar ratio of a:c was 1:1, and an EW was 660) and LLZO (an average particle diameter (D50) of 300 nm) were added at a weight ratio of 1:0.04 to NMP and mixed to prepare a coating solution. Afterward, the coating solution was applied on a substrate and dried, thereby preparing a solid polymer electrolyte having a thickness of 50 μm.

Comparative Example 3

An ionomer represented by Chemical Formula 1d (a molar ratio of a:c was 1:1, and an EW was 660) and LLZO (an average particle diameter (D50) of 300 nm) were added at a weight ratio of 1:10 to NMP and mixed to prepare a coating solution. Afterward, the coating solution was applied on a substrate and dried, thereby preparing a solid polymer electrolyte having a thickness of 50 μm.

EXPERIMENTAL EXAMPLES

Experimental Example 1

Ionic conductivities of the solid polymer electrolyte samples prepared in Examples 1 to 8 and Comparative Example 1 were measured under conditions of an AC method (1 MHz to 100 mHz) and an amplitude of 10 mV using VMP3 commercially available from Bio-Logic Science Instruments, and results thereof are shown in Table 1 below.

Subsequently, the solid polymer electrolyte sample was impregnated with a liquid electrolyte (organic solvent containing 1M $LiPF_6$ dissolved therein (a volume ratio of EC/EMC=4/6)) to form a gel polymer electrolyte in which a portion thereof was impregnated with a liquid. Then, ionic conductivity of the resultant polymer electrolyte was measured under conditions of an AC method (1 MHz to 100 mHz) and an amplitude of 10 mV using VMP3 commercially available from Bio-Logic Science Instruments, and results thereof are shown in Table 1 below.

In addition, an oxidation current was measured through linear sweep voltammetry (LSV) at 60° C. using a potentiostat (model 270A commercially available from EG&G), and results thereof are shown in Table 1 below.

TABLE 1

| | Composition for polymer electrolyte | | | | | Ionic conductivity (S/cm) at 25° C. | Oxidation current (A), at 60° C. and 5 V |
| --- | --- | --- | --- | --- | --- | --- | --- |
| | Single ion-conductive polymer | Additive | Binder | Weight ratio | | | |
| Example 1 | Chemical Formula 1a | LLZO | — | 1:1.5:0 | Before impregnation with liquid electrolyte | $1.5 \times 10^{-5}$ | — |
| | | | | | After impregnation with liquid electrolyte | $1.5 \times 10^{-4}$ | $5.0 \times 10^{-5}$ |
| Example 2 | Chemical Formula 1b | LLZO | — | 1:1.5:0 | Before impregnation with liquid electrolyte | $2.1 \times 10^{-5}$ | — |
| | | | | | After impregnation with liquid electrolyte | $1.5 \times 10^{-4}$ | $4.0 \times 10^{-5}$ |
| Example 3 | Chemical Formula 1c | LLZO | — | 1:1.5:0 | Before impregnation with liquid electrolyte | $3.0 \times 10^{-5}$ | — |
| | | | | | After impregnation with liquid electrolyte | $3.5 \times 10^{-4}$ | $3.0 \times 10^{-5}$ |
| Example 4 | Chemical Formula 1d | LLZO | — | 1:1.5:0 | Before impregnation with liquid electrolyte | $6.2 \times 10^{-5}$ | — |
| | | | | | After impregnation with liquid electrolyte | $6.5 \times 10^{-4}$ | $2.0 \times 10^{-5}$ |
| Example 5 | Chemical Formula 1d | LLZO | PVDF | 1:9:0.25 | Before impregnation with liquid electrolyte | $3.8 \times 10^{-5}$ | — |
| | | | | | After impregnation with liquid electrolyte | $3.0 \times 10^{-4}$ | $2.2 \times 10^{-5}$ |
| Example 6 | Chemical Formula 1d | LLZO | PVDF | 1:5:0.25 | Before impregnation with liquid electrolyte | $5.8 \times 10^{-5}$ | — |
| | | | | | After impregnation with liquid electrolyte | $6.0 \times 10^{-4}$ | $1.0 \times 10^{-5}$ |
| Example 7 | Chemical Formula 1d | LLZO | PVDF | 1:3:0.25 | Before impregnation with liquid electrolyte | $5.8 \times 10^{-5}$ | — |
| | | | | | After impregnation with liquid electrolyte | $6.0 \times 10^{-4}$ | $2.0 \times 10^{-5}$ |
| Example 8 | Chemical Formula 1d | LLZO | PVDF | 1:0.1:0.25 | Before impregnation with liquid electrolyte | $2.1 \times 10^{-5}$ | — |
| | | | | | After impregnation with liquid electrolyte | — | — |

TABLE 1-continued

| | Composition for polymer electrolyte | | | | | Ionic conductivity (S/cm) at 25° C. | Oxidation current (A), at 60° C. and 5 V |
|---|---|---|---|---|---|---|---|
| | Single ion-conductive polymer | Additive | Binder | Weight ratio | | | |
| Comparative Example 1 | Chemical Formula 1d | — | PVDF | 1:0:0.25 | Before impregnation with liquid electrolyte | $1.2 \times 10^{-5}$ | — |
| | | | | | After impregnation with liquid electrolyte | $1.0 \times 10^{-4}$ | $9.0 \times 10^{-5}$ |
| Comparative Example 2 | Chemical Formula 1d | LLZO | — | 1:0.04:0 | Before impregnation with liquid electrolyte | $1.1 \times 10^{-5}$ | — |
| | | | | | After impregnation with liquid electrolyte | $1.4 \times 10^{-4}$ | $9.0 \times 10^{-5}$ |
| Comparative Example 3 | Chemical Formula 1d | LLZO | — | 1:10:0 | Before impregnation with liquid electrolyte | $8.0 \times 10^{-6}$ | — |
| | | | | | After impregnation with liquid electrolyte | $9.1 \times 10^{-5}$ | — |

Referring to Table 1, it can be seen that the solid polymer electrolytes according to Examples 1 to 8 all exhibited an ionic conductivity of $1.5 \times 10^{-5}$ or more, whereas the solid polymer electrolyte according to Comparative Example 1, in which a ceramic electrolyte was not included, exhibited an ionic conductivity of about $1.2 \times 10^{-5}$, which was poorer than those of the solid polymer electrolytes according to Examples 1 to 8.

In addition, it can be seen that the gel polymer electrolytes formed by impregnating the solid polymer electrolytes according to Examples 1 to 7 with a liquid electrolyte mostly exhibited an ionic conductivity of $1.5 \times 10^{-5}$ or more, but oxidation currents thereof were suppressed to $5.0 \times 10^{-5}$ or less.

On the other hand, it can be seen that the gel polymer electrolyte formed by impregnating the solid polymer electrolyte according to Comparative Example 1, in which a ceramic electrolyte was not included, with a liquid electrolyte exhibited an ionic conductivity of about $1.0 \times 10^{-4}$ and an oxidation current of $9.0 \times 10^{-5}$, which were poorer than those of the solid polymer electrolytes according to Examples 1 to 7. That is, it can be seen that the solid polymer electrolyte according to Comparative Example 1 and the gel polymer electrolyte formed therefrom exhibited no or an insignificant function of stabilizing an electrolyte by the Lewis acid-base mechanism of the ceramic electrolyte, and thus an oxidation current amount was increased compared to Examples.

Meanwhile, it can be seen that the solid polymer electrolyte according to Comparative Example 2, in which a trace amount of a ceramic electrolyte was included, exhibited an ionic conductivity of $1.1 \times 10^{-5}$ before impregnation with a liquid electrolyte, and the gel solid polymer electrolyte formed after impregnation with a liquid electrolyte exhibited an ionic conductivity of $1.4 \times 10^{-4}$ and an oxidation current of $9.0 \times 10^{-5}$, which were poorer than those of the solid polymer electrolytes according to Examples 1 to 8.

In addition, it can be seen that, in the case of the solid polymer electrolyte according to Comparative Example 3 in which an excessive amount of a ceramic electrolyte was included, since a large amount of internal pores were formed when a molding process was performed through a solution coating method to reduce interfacial contact between electrolytes, the solid polymer electrolyte exhibited an ionic conductivity of $8.0 \times 10^{-6}$, and the gel solid polymer electrolyte formed after impregnation with a liquid electrolyte exhibited an ionic conductivity of $9.1 \times 10^{-5}$, which were much poorer than those of the solid polymer electrolytes according to Examples 1 to 8.

Example 9

Preparation of Composition for Polymer Electrolyte

An ionomer represented by Chemical Formula 1d (a molar ratio of a:c was 1:1, and an EW was 660) and LLZO (an average particle diameter (D50) was 300 nm) were added at a weight ratio of 1:2.5 to NMP and mixed to prepare a composition for a polymer electrolyte.

(Manufacture of Positive Electrode)

A 5.0 V class lithium nickel manganese composite oxide ($LiNi_{0.5}Mn_{1.5}O_4$, LNMO) as a positive electrode active material, carbon black as a conductive material, and PVDF as a binder were added at a weight ratio of 92:4:4 to NMP as a solvent to prepare a positive electrode active material slurry.

Subsequently, the positive electrode active material slurry was applied on a thin aluminum (Al) film having a thickness of 20 μm, then dried and rolled to manufacture a positive electrode 47 having a thickness of 30 μm.

(Manufacture of Negative Electrode)

A negative electrode active material ($Li_4Ti_5O_{12}$), a conductive material (Super-P), and a binder (PVDF) were added at a weight ratio of 85:5:10 to NMP and mixed to prepare a negative electrode active material slurry.

Subsequently, 7.5 parts by weight of the composition for a polymer electrolyte was mixed with respect to 100 parts by weight of the negative electrode active material slurry to prepare a coating solution.

Afterward, the coating solution was applied on aluminum foil having a thickness of 20 μm, then rolled and dried to manufacture a negative electrode composite 49.

(Manufacture of Secondary Battery)

On a first polyolefin-based porous separator 45 having a thickness of 20 μm, the negative electrode composite 49 including the composition for a polymer electrolyte, a second polyolefin-based porous separator 45-1, and the above-manufactured positive electrode 47 were sequentially laminated to manufacture an electrode assembly (see FIG. 4).

The electrode assembly was loaded in a pouch-shaped battery case, and a 0.5 M $LiPF_6$ electrolyte (in a weight ratio of ethylene carbonate (EC)/ethyl methyl carbonate (EMC)= 3:7) was then injected to manufacture a high-voltage LNMO/LTO battery (full cell).

Comparative Example 4

A high-voltage battery was manufactured in the same manner as in Example 9 except that the composition for a polymer electrolyte was not included upon the manufacture of a negative electrode.

Experimental Example 2

Each secondary battery according to Example 9 and Comparative Example 4 was charged at 25° C. with a constant current of 0.1 C until a voltage of 3.2 V was reached and then with a constant voltage of 3.2 V until a charge current reached 5% of the battery capacity. Then, the battery was maintained for 10 minutes and then discharged with a constant current of 0.1 C until a voltage of 2.0 V was reached. Afterward, the battery was charged at 1 C at room temperature (25° C.), and a charge capacity in a CC period and a discharge capacity at 1 C were measured using charge/discharge equipment (PNE-0506 manufactured by PNE SOLUTION Co., Ltd.; 5 V; 500 mA). Results thereof are shown in Table 2 below.

Figure 6:
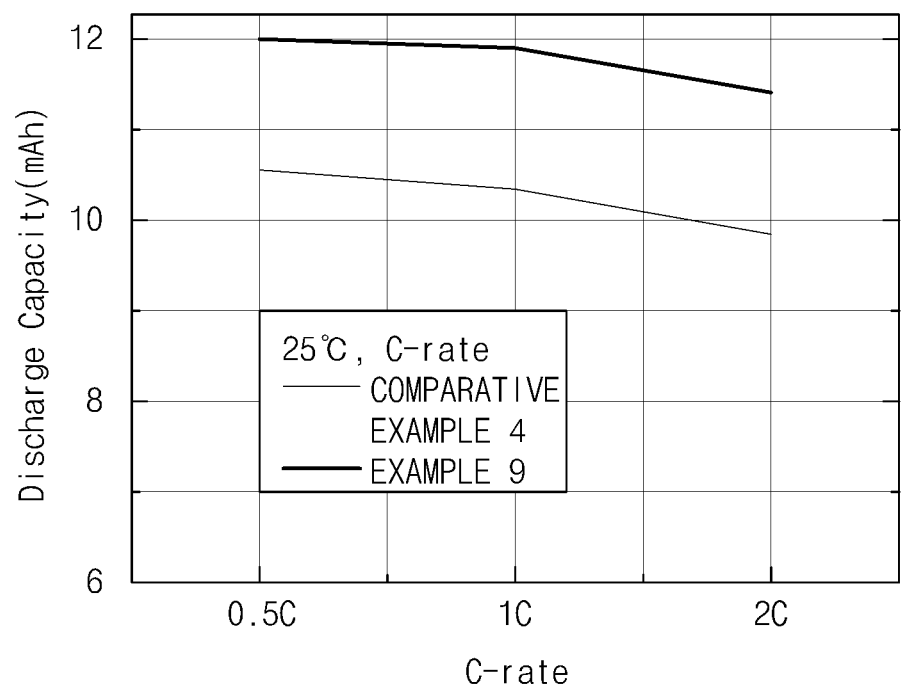
FIG. 6 is a comparison graph of rate capability (C-rate) of a lithium secondary battery according to Experimental Example 2.

In addition, after a charge capacity at 1 C was measured, discharge capacities according to C-rates of 0.5 C/1.0 C/2.0 C with respect to charging at 0.5 C were measured, and results thereof are shown in FIG. 6.

TABLE 2

|  | 1 C, Charge capacity [mAh] | 1 C, Discharge capacity [mAh] |
| --- | --- | --- |
| Example 9 | 11.2 | 11.8 |
| Comparative Example 4 | 9.8 | 10.2 |

Referring to Table 2 and FIG. 6, it can be seen that the secondary battery according to Example 9, in which the negative electrode composite including the composition for a polymer electrolyte according to the present invention was included, exhibited an improvement in both charge and discharge capacities compared to the secondary battery according to Comparative Example 4, in which a negative electrode not including the composition for a polymer electrolyte was included.

Experimental Example 3

Each secondary battery according to Example 9 and Comparative Example 4 was charged at 45° C. with a constant current of 0.1 C until a voltage of 3.2 V was reached and then with a constant voltage of 3.2 V until a charge current reached 5% of the battery capacity. Then, the battery was maintained for 10 minutes and then discharged with a constant current of 0.1 C until a voltage of 2.0 V was reached. Afterward, the battery was charged at 2 C at a high temperature (45° C.), and a charge capacity in a CC period and a discharge capacity at 5 C were measured using charge/discharge equipment (PNE-0506 manufactured by PNE SOLUTION Co., Ltd.; 5 V; 500 mA). Results thereof are shown in Table 3 below.

Figure 7:
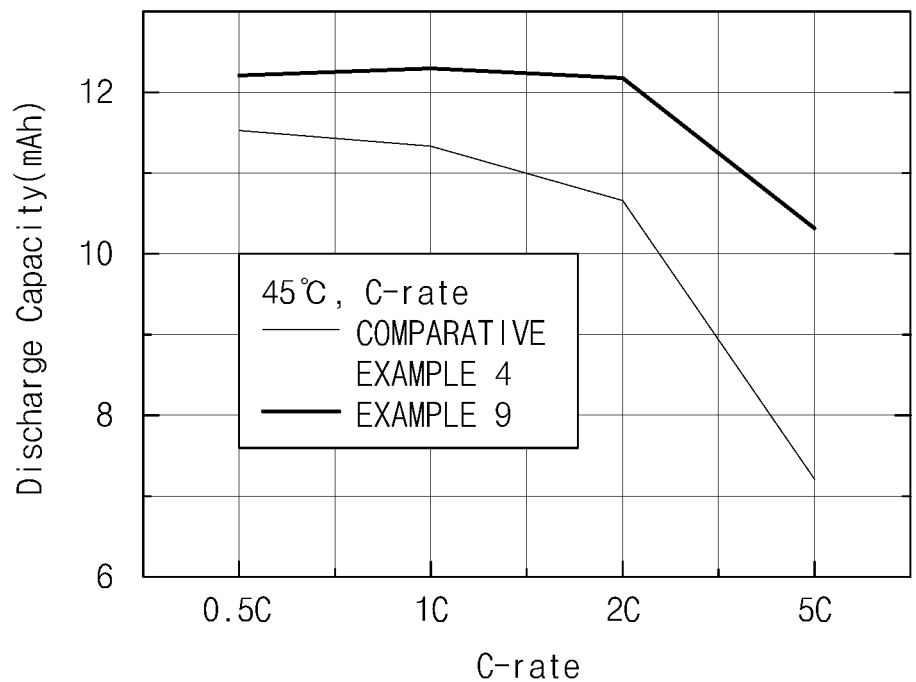
FIG. 7 is a comparison graph of rate capability (C-rate) of a lithium secondary battery according to Experimental Example 3.

In addition, after a charge capacity at 2 C was measured, discharge capacities according to C-rates of 0.5 C/1.0 C/2.0 C/5.0 C with respect to charging at 0.5 C were measured, and results thereof are shown in FIG. 7.

TABLE 3

|  | 2 C, Charge capacity [mAh] | 5 C, Discharge capacity [mAh] |
| --- | --- | --- |
| Example 9 | 10.8 | 10.5 |
| Comparative Example 4 | 9.7 | 7.0 |

Referring to Table 3 and FIG. 7, it can be seen that the secondary battery according to Example 9, in which the negative electrode composite including the composition for a polymer electrolyte according to the present invention was included, suppressed concentration polarization by mitigating a lithium concentration gradient generated in a cell during charging and discharging, and thus exhibited an improvement in both charge and discharge capacities compared to the secondary battery according to Comparative Example 4, in which a negative electrode not including the composition for a polymer electrolyte was included.

Experimental Example 4

Each secondary battery according to Example 9 and Comparative Example 4 was charged at 45° C. with a constant current of 1 C until a voltage of 3.2 V was reached and then with a constant voltage of 3.2 V until a charge current of 0.275 mA was reached. Then, the battery was maintained for 10 minutes and then discharged with a constant current of 1 C until a voltage of 2.0 V was reached. This process was set as one cycle and repeated in 250 cycles. Then, the capacities after the 1st cycle and $250^{th}$ cycle were measured using charge/discharge equipment (PNE-0506 manufactured by PNE SOLUTION Co., Ltd.; 5 V; 500 mA), and results thereof are shown in Table 4 below and FIG. 8.

TABLE 4

|  | Initial capacity, 45° C. [mAh] | Capacity after $250^{th}$ cycle, 45° C. [mAh] |
| --- | --- | --- |
| Example 9 | 12.0 | 9.5 |
| Comparative Example 4 | 11.0 | 4.0 |

Figure 8:
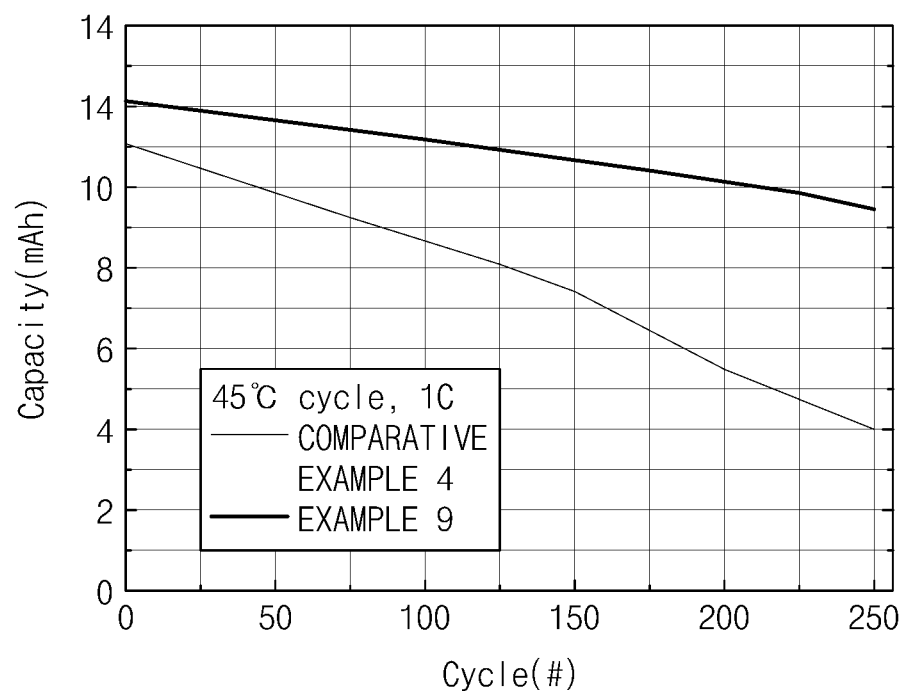
FIG. 8 is a graph illustrating a measurement result for cycle lifespan evaluation of a lithium secondary battery according to Experimental Example 4.

As shown in Table 4 and FIG. 8, it can be seen that the secondary battery according to Example 9, in which the negative electrode composite including the composition for a polymer electrolyte according to the present invention was included, exhibited an excellent cycle lifespan characteristic compared to the secondary battery according to Comparative Example 4, in which a negative electrode not including the composition for a polymer electrolyte was included.

Example 10. (Secondary Battery Including Positive Electrode Composite)

(Preparation of Composition for Polymer Electrolyte)

An ionomer represented by Chemical Formula 1d (a molar ratio of a:c was 1:1, and a weight average molecular weight (Mw) was 10,000) and LLZO (an average particle diameter (D50) was 300 nm) were added at a weight ratio of 1:2 to NMP and mixed to prepare a composition for a polymer electrolyte.

(Manufacture of Positive Electrode)

A positive electrode active material ($LiNi_{0.5}Mn_{1.5}O_4$, LNMO), carbon black, and PVDF as a binder were added at a weight ratio of 91:4:5 to NMP and mixed to prepare a positive electrode active material slurry.

Subsequently, 7.5 parts by weight of the composition for a polymer electrolyte was mixed with respect to 100 parts by weight of the positive electrode active material slurry to prepare a coating solution.

Afterward, the coating solution was applied on aluminum foil having a thickness of 20 μm, then rolled and dried to manufacture a positive electrode composite 59 having a thickness of 20 μm.

(Manufacture of Secondary Battery)

On a first polyolefin-based porous separator 55 having a thickness of 20 μm, lithium metal as a negative electrode 51, a second polyolefin-based porous separator 55-1, and the positive electrode composite 59 including the composition for a polymer electrolyte were sequentially laminated to manufacture an electrode assembly (see FIG. 5).

The electrode assembly was loaded in a pouch-shaped battery case, and a 0.5 M $LiPF_6$ electrolyte (ethylene carbonate (EC)/ethyl methyl carbonate (EMC)=30:70 wt %) was then injected to manufacture a high-voltage LNMO/LTO battery (full cell).

Comparative Example 5

A high-voltage battery was manufactured in the same manner as in Example 10 except that the composition for a polymer electrolyte was not included upon the manufacture of a positive electrode.

Experimental Example 5

Each secondary battery according to Example 10 and Comparative Example 5 was charged at 25° C. with a constant current of 0.1 C until a voltage of 3.2 V was reached and then with a constant voltage of 3.2 V until a charge current reached 5% of the battery capacity. Then, the battery was maintained for 10 minutes and then discharged with a constant current of 0.1 C until a voltage of 2.0 V was reached. Afterward, the battery was charged at 1 C at room temperature (25° C.), and a charge capacity in a CC period and a discharge capacity at 1 C were measured using charge/discharge equipment (PNE-0506 manufactured by PNE SOLUTION Co., Ltd.; 5 V; 500 mA). Results thereof are shown in Table 5 below.

TABLE 5

|  | 1 C, Charge capacity [mAh] | 1 C, Discharge capacity [mAh] |
| --- | --- | --- |
| Example 10 | 10.5 | 12.7 |
| Comparative Example 5 | 9.8 | 10.2 |

Referring to Table 5, it can be seen that the secondary battery according to Example 10, in which the positive electrode composite including the composition for a polymer electrolyte was included, exhibited an improvement in both charge and discharge capacities compared to the secondary battery according to Comparative Example 5, in which a positive electrode not including the composition for a polymer electrolyte was included.

Experimental Example 6

Each secondary battery according to Example 10 and Comparative Example 5 was charged at 45° C. with a constant current of 0.1 C until a voltage of 3.2 V was reached and then with a constant voltage of 3.2 V until a charge current reached 5% of the battery capacity. Then, the battery was maintained for 10 minutes and then discharged with a constant current of 0.1 C until a voltage of 2.0 V was reached. Afterward, the battery was charged at 2 C at a high temperature (45° C.), and a charge capacity in a CC period and a discharge capacity at 5 C were measured using charge/discharge equipment (PNE-0506 manufactured by PNE SOLUTION Co., Ltd.; 5 V; 500 mA). Results thereof are shown in Table 6 below.

TABLE 6

|  | 2 C, Charge capacity [mAh] | 5 C, Discharge capacity [mAh] |
| --- | --- | --- |
| Example 10 | 10.1 | 11.2 |
| Comparative Example 5 | 9.7 | 7.0 |

Referring to Table 6, it can be seen that the secondary battery according to Example 10, in which the positive electrode composite including the composition for a polymer electrolyte according to the present invention was included, suppressed concentration polarization by mitigating a lithium concentration gradient generated in a cell during charging and discharging, and thus exhibited an improvement in both charge and discharge capacities compared to the secondary battery according to Comparative Example 5, in which a positive electrode not including the composition for a polymer electrolyte was included.

Experimental Example 7

Each secondary battery according to Example 10 and Comparative Example 5 was charged at 45° C. with a constant current of 1 C until a voltage of 3.2 V was reached and then with a constant voltage of 3.2 V until a charge current of 0.275 mA was reached. Then, the battery was maintained for 10 minutes and then discharged with a constant current of 1 C until a voltage of 2.0 V was reached. This process was set as one cycle and repeated in 250 cycles. Then, the capacities after the 1st cycle and $250^{th}$ cycle were measured using charge/discharge equipment (PNE-0506 manufactured by PNE SOLUTION Co., Ltd.; 5 V; 500 mA), and results thereof are shown in Table 7 below.

TABLE 7

|  | Initial capacity, 45° C. [mAh] | Capacity after $250^{th}$ cycle, 45° C. [mAh] |
| --- | --- | --- |
| Example 10 | 12.7 | 10.5 |
| Comparative Example 5 | 10.2 | 4.0 |

As shown in Table 7, it can be seen that the secondary battery according to Example 10, in which the positive electrode composite including the composition for a polymer electrolyte according to the present invention was included, exhibited an excellent cycle lifespan characteristic compared to the secondary battery according to Comparative Example 5, in which a positive electrode not including the composition for a polymer electrolyte was included.

According to the present invention, a composition for a polymer electrolyte which includes a single ion-conductive polymer with high ionic conductivity and lithium ion mobility is provided, and a solid polymer electrolyte and/or an electrode composite with excellent ionic conductivity, enhanced interfacial stability with an electrode, and suppressed concentration polarization may be prepared using the same. Therefore, a lithium secondary battery with enhanced electrochemical stability and cell performance may be manufactured.

The invention claimed is:

1. A composition for a polymer electrolyte consisting of:
   an organic solvent;
   a single ion-conductive polymer including a unit represented by Chemical Formula 1 below;
   an additive consisting of a ceramic electrolyte and optionally inorganic particles; and
   optionally a binder,
   wherein the ceramic electrolyte includes any one selected from the group consisting of lithium lanthanum zirconate, lithium aluminum germanium phosphate, lithium aluminum titanium phosphate, lithium lanthanum titanate, lithium germanium phosphorus sulfide, and lithium phosphorus sulfide, or a mixture of two or more thereof,
   wherein the inorganic particles include any one selected from the group consisting of $Al_2O_3$, $BaTiO_3$, $SnO_2$, $CeO_2$, $SiO_2$, $TiO_2$, $Li_3PO_4$, NiO, ZnO, MgO, $Mg(OH)_2$, CaO, $ZrO_2$, $Ta_2O_5$, $Y_2O_3$, $Pb(Zr,Ti)O_3$ (PZT), $Pb(Mg_{3}Nb_{2/3})O_3$-$PbTiO_3$ (PMN-PT), and hafnia ($HfO_2$), or a mixture of two or more thereof, and
   wherein a weight ratio of the single ion-conductive polymer:the additive(s) is 1:0.1 to 1:9:

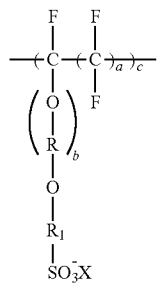

[Chemical Formula 1]

wherein R is —$CF_2$—[$CF(CF_3)$]$_m$[$CF_2$]$_n$—, wherein m is any one integer of 1 to 3 and n is any one integer of 1 to 5,
$R_1$ is —$CF_2$—($CF_2$)$_o$—, wherein o is any one integer of 0 to 3,
X is $H^+$ or $Li^+$,
a and c represent a mole number of a repeat unit,
a molar ratio of a:c is 1:1 to 10:1, and
b is an integer of 1.

2. The composition of claim 1, wherein the single ion-conductive polymer includes a unit represented by Chemical Formula 1a below:

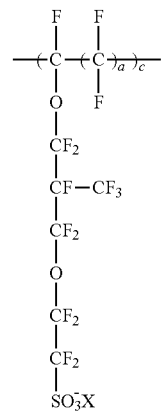

[Chemical Formula 1a]

wherein X is $H^+$ or $Li^+$,
a and c represent a mole number of a repeat unit, and
a molar ratio of a:c is 1:1 to 10:1.

3. A polymer electrolyte consisting of:
   an organic solvent;
   a single ion-conductive polymer including a unit represented by Chemical Formula 1d below;
   an additive consisting of a ceramic electrolyte and optionally inorganic particles; and
   optionally a binder,
   wherein the ceramic electrolyte is lithium lanthanum zirconate,
   wherein the inorganic particle includes any one selected from the group consisting of $Al_2O_O$, $BaTiO_3$, $SnO_2$, $CeO_2$, $SiO_2$, $TiO_2$, $Li_3PO_4$, NiO, ZnO, MgO, $Mg(OH)_2$, CaO, $ZrO_2$, $Ta_2O_5$, $Y_2O_3$, $Pb(Zr,Ti)O_3$ (PZT), $Pb(Mg_3Nb_{2/3})O_3$-$PbTiO_3$ (PMN-PT), and hafnia ($HfO_2$), or a mixture of two or more thereof, and
   wherein a weight ratio of the single ion-conductive polymer : the additive(s) is 1:0.1 to 1:9:

[Chemical Formula 1d]

X is $H^+$ or $Li^+$,
a and c represent a mole number of a repeat unit, and
a molar ratio of a : c is 1:1 to 10:1.

4. The composition of claim 3, wherein a weight ratio of the single ion-conductive polymer:the additive(s) is 1:1 to 1:5.

5. A solid polymer electrolyte formed by curing the composition of claim 3.

6. An electrode composite comprising the composition of claim 3.

7. The electrode composite of claim 6, wherein the electrode composite is a positive electrode composite or a negative electrode composite.

8. The electrode composite of claim 6, comprising an electrode current collector and an electrode mixture layer applied on the electrode current collector,
    wherein the electrode mixture layer includes an electrode active material slurry and the composition.

9. A lithium secondary battery comprising a positive electrode, a negative electrode, and a solid polymer electrolyte formed by curing the composition of claim 3.

10. A lithium secondary battery comprising an electrode composite, wherein the electrode composite comprises the composition of claim 3.

\* \* \* \* \*